United States Patent [19]
Sloane

[11] Patent Number: 5,882,044
[45] Date of Patent: Mar. 16, 1999

[54] SPLINED SAFETY LOCK WITH RESILIENT RETAINING RING

[76] Inventor: Norman S. Sloane, 2834 Hamner Ave., Norco, Calif. 91760

[21] Appl. No.: 915,815

[22] Filed: Aug. 21, 1997

Related U.S. Application Data

[63] Continuation-in-part of Ser. No. 593,453, Jan. 29, 1996.
[51] Int. Cl.[6] ........................................ F16L 55/00
[52] U.S. Cl. ........................ 285/92; 285/148.19; 285/321; 285/330
[58] Field of Search .............................. 285/92, 321, 330, 285/146.19

[56] References Cited

U.S. PATENT DOCUMENTS

| | | |
|---|---|---|
| 5,094,491 | 3/1992 | Berghamma et al. . |
| 5,215,336 | 6/1993 | Worthing . |
| 5,269,566 | 12/1993 | Do et al. . |
| 5,348,349 | 9/1994 | Sloane . |
| 5,362,111 | 11/1994 | Harbin . |

FOREIGN PATENT DOCUMENTS 427660  5/1991  European Pat. Off. .

Primary Examiner—Dave W. Arola
Attorney, Agent, or Firm—Colin P. Abrahams

[57] ABSTRACT

A safety retainer assembly is disclosed herein for holding a shaped nut in position on a threaded nipple or the like, which includes an annular body having an internal bore configured adjacent one open end to conform with the shape of the nut and having an external shoulder with a stepped opening or hole for receiving the catch of a retaining pin formed in a rectilinear length of a locking clip. Internal splines are provided adjacent the other open end of the body shoulder adapted to receive mating external splines carried on a collar of the nipple to prevent relative movement therebetween whereby the nut cannot back off from its threaded connection with the threaded nipple. The circular locking clip includes a holding ear or dog on one end fitted into the stepped opening at the opposite end thereof from the seating of the release catch that is carried on the other end of the circular safety clip.

19 Claims, 2 Drawing Sheets

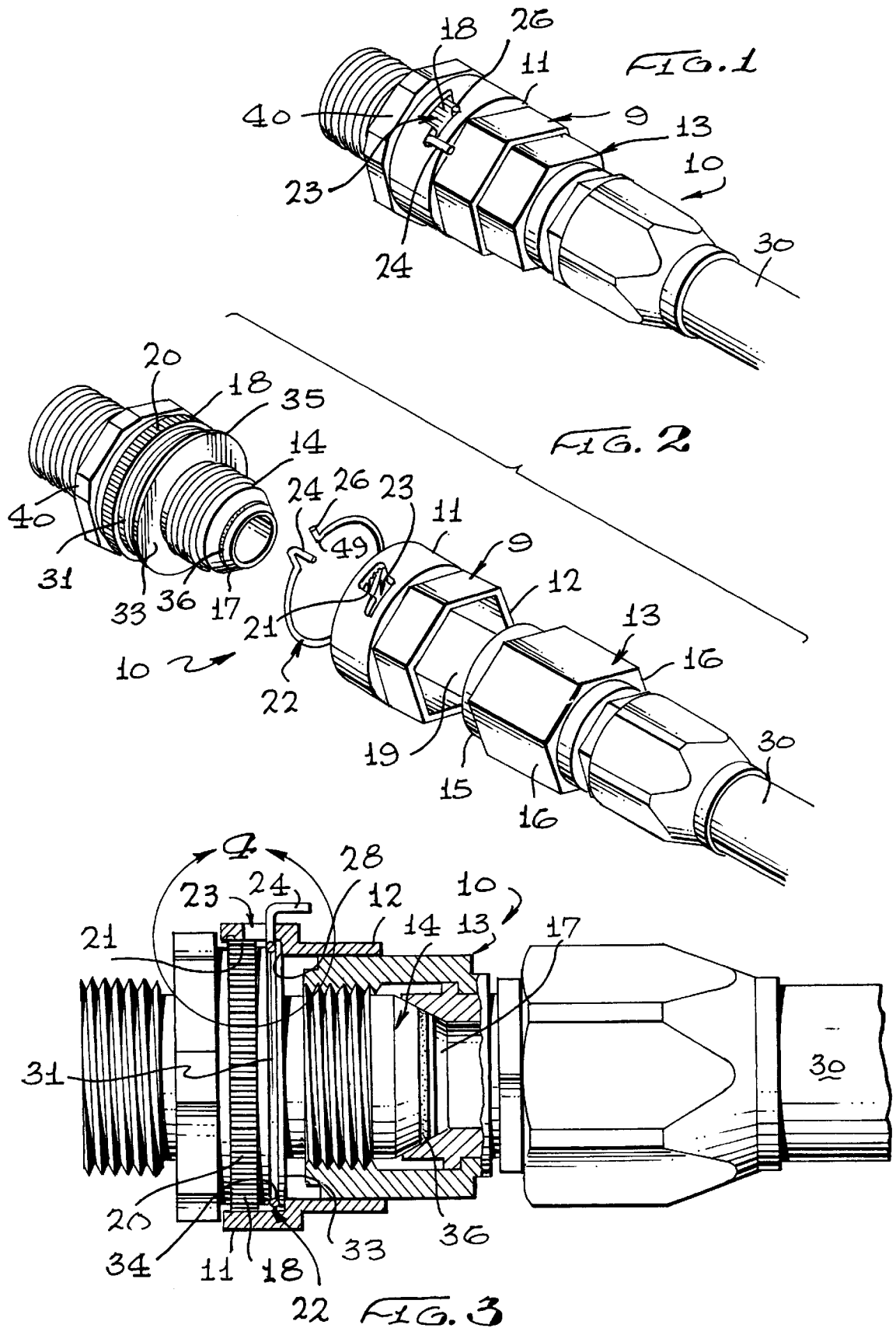

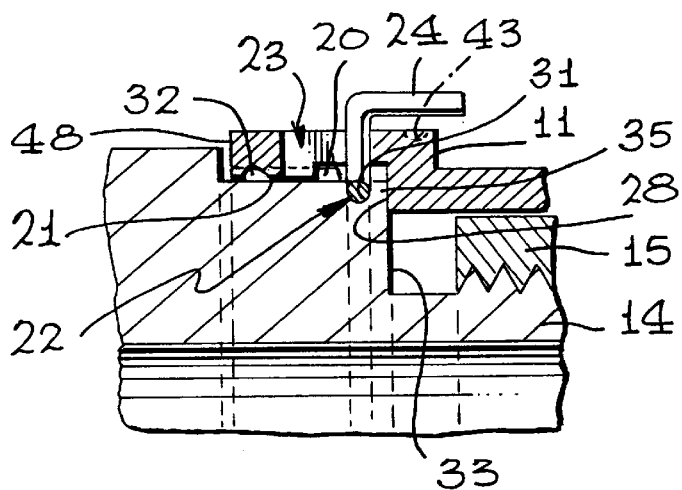
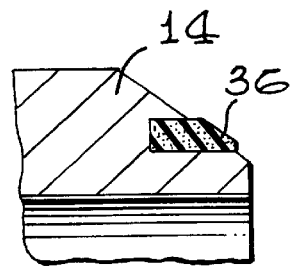
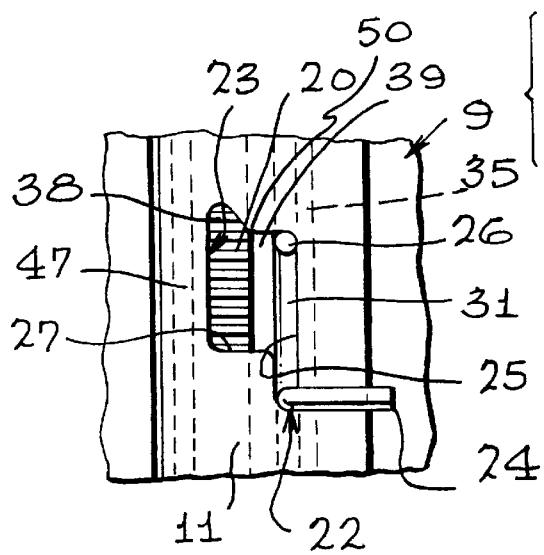
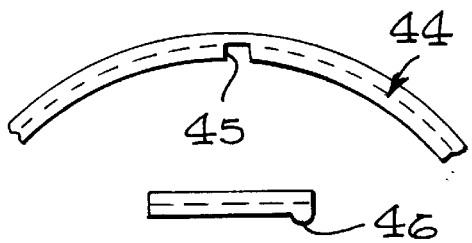
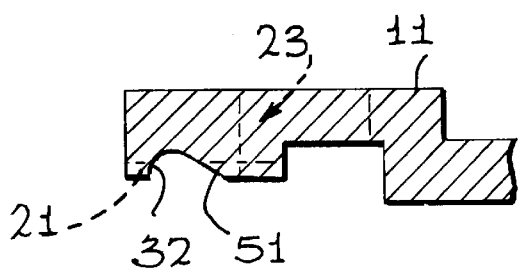
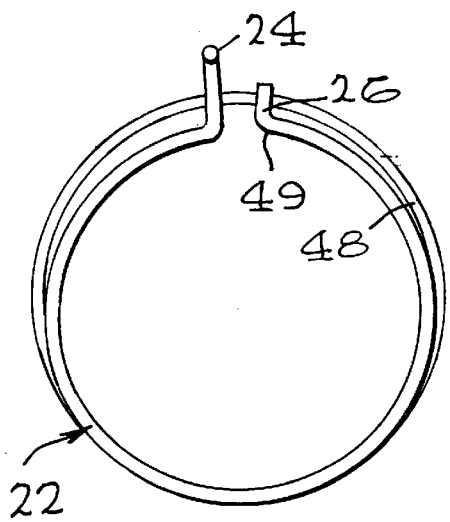

SPLINED SAFETY LOCK WITH RESILIENT RETAINING RING

This is a continuation-in-part of U.S. Ser. No. 08/593,453 filed Jan. 29, 1996.

BACKGROUND OF THE INVENTION

1. Field of the Invention

The present invention relates to retaining devices and, more particularly, to a novel retainer which, when used, prevents inadvertent movement between a nut and its mounting or support, such as a nipple installed in a fuel line system or electrical connection.

2. Brief Description of the Prior Art

In the past, it has been the conventional practice to employ couplings which, when connected together, serve as conduits for a fluid or electrical current. In such systems as fuel lines, couplings are extremely important and assurance must be provided against inadvertent backing-off of coupling nuts so that fluid leakage will not occur. In high performance vehicles and race cars, excessive vibration often causes nuts in a threaded coupling to loosen and back-off from their sealed coupled position. In order to prevent such an occurrence, attempts have been made to drill special holes in the nut through which safety wire can be threaded and subsequently anchored to fixed supporting members. Such a situation requires that a hole be drilled through a suitable thickness in the nut which presents a problem since the drilling of a special hole is time-consuming and reduces the structural integrity of the coupling itself.

Furthermore, in situations where fixed supports are not available to which the safety wire can be anchored, even the drilling of a hole through the coupling nut itself would not be sufficient for eliminating loosening of the nut due to excessive vibration. Such vibration has a tendency to loosen the threaded engagement of the nut with the nipple in spite of the safety wire securement.

An attempt to resolve the above difficulties is disclosed in U.S. Pat. Nos. 5,348,349; 5,094,491 and 4,27,660. However, these prior disclosures are not as convenient to operate by a user as the present invention and do not provide as positive a retention as the present inventive concept.

Therefore, a long-standing need has existed to provide a retaining means for holding a shaped nut in position with respect to a coupling situation, such as when a nipple is used the nut will not back-off or loosen although the installation is subjected to severe vibrations. Such a means should not require the alteration or modification of the existing coupling members and, preferably, should not interfere with the proper seating of the coupling members so as to maintain an effective seal to prevent leakage of fluids.

SUMMARY OF THE INVENTION

Accordingly, the above problems and difficulties are addressed by the present invention which provides a novel safety retaining sleeve comprising a ring-like sleeve having an open-ended bore with a shaped section adapted to conform and fit over a shaped nut. The sleeve includes internal splines carried on a shoulder section adapted to slidably engage with external splines carried on a collar of a nipple. The sleeve further includes an opening in the shoulder section for receiving the opposite ends of a circular retaining ring. One end is a release catch while the other end has a holding ear or dog. The retaining sleeve radially or axially slides to urge the components of the assembly together. In one form, the nipple collar is provided with a plurality of external splines and the inner surface of the splined section of the retaining sleeve includes a plurality of mateable splines intended to match and conform with the splines of the nipple collar. The locking clip or retaining ring catch is moveable between an operative position and an inoperative position to achieve either locking or release functions. A feature resides in the fact that the overall length of the retainer body is captured on the coupling nut and nipple collar so that the extremities of the retainer do not interfere with the coupling installation whereby proper sealing of the installation is assured without interference from the retaining ring.

Therefore, it is among the primary aspects of the present invention to provide a novel manually releasable safety coupling assembly for maintaining a shaped nut in position with respect to a coupling installation such as a fuel line system.

Another aspect of the present invention is to provide a simple retaining sleeve adapted to have a splined inner bore conformal with the splined shape of a coupling collar so that the nut, when combined with a resilient rectilinear retaining clip, is prevented from backing-off once the coupling has been completed and locked.

Another aspect of the invention resides in the elimination of system contamination by covering access to the coupling threaded areas. Still another aspect is to provide an inexpensive means for preventing decoupling of a two-piece coupling system employed in a volatile fluid or pneumatic line whereby the coupling members are prevented from "back-off" problems and which employs a resilient clip applying a holding pressure or load force to the system components.

A further aspect resides in providing a retaining sleeve assembly having 360° range of contact surface between coupling components to prevent nut rotation.

Another aspect involves a coupling which reduces maintenance time since visual inspection of the coupling joint is available.

Another aspect resides in a coupling assembly having a splined safety lock ring operable only in a rectilinear manner to tighten or loosen the sealed coupling relationship of the components.

The invention may employ mated splines between coupling components enabling the nut to be locked in place within the minimum-to-maximum torque specifications.

Further, a retainer sleeve may be provided having internal splines on one end and a plurality of flats on its other end which cooperate with coupling component splines and flats to maintain the coupling components in sealed torqued relationship.

Another aspect resides in the sleeve being centered on the fitting so as to eliminate the chance of cross threading.

A further aspect resides in a resilient seal of a raised configuration to conform to any irregularities of a mating surface.

Yet another aspect resides in the ability to hand tighten the coupling nut against the seal so as to force the mating surfaces together without any distortion to the coupling members.

Another aspect resides in rectilinear clip holding the sleeve to make the components stay together as one unit.

BRIEF DESCRIPTION OF THE DRAWINGS

The present invention, both as to its organization and manner of operation, may best be understood by reference to the following description, taken in conjunction with the accompanying drawings in which:

FIG. 1 is a perspective view of the retainer body or sleeve component used in the present invention;

FIG. 2 is an exploded perspective view showing the novel safety retaining device used in the assembly shown in FIG. 1;

FIG. 3 is an enlarged cross-sectional view of the retaining device components in a typical installation such as a fuel system.

FIG. 4 is an enlarged fragmentary view of the retaining device shown in FIG. 3;

FIG. 5 is a sectional view of the nipple in the coupling when a seal is used;

FIG. 6 is a fragmentary plan view of the retainer opening as shown in FIGS. 1 and 2;

FIG. 7 shows a cover for use in the invention;

FIG. 8 shows a partially installed ring; and

FIG. 9 shows a starting ramp of the invention.

DESCRIPTION OF THE PREFERRED EMBODIMENT

Referring to FIGS. 1 and 2, the novel safety retaining device 10 incorporating the present invention is illustrated in the general direction of arrow 10 which includes a body 9 having a cylindrical portion 11 and a shaped portion 12. The retaining device 10 is intended to be employed in connection with a coupling nut 13 that includes an internal threaded bore which is intended to be screwed or threaded onto the external threads of a threaded member or nipple 14. The coupling nut 13, as is the conventional practice, includes a cylindrical portion 15 which is immediately adjacent to and ahead of a hexagonal configured nut portion 16. The nut portion includes a plurality of flats which is typical of a hexagon nut. Also, the cylindrical portion 15 of the nut includes an internal threaded bore leading into a tapered entrance that is intended to seat and seal against a conformal sealing portion 17 carried on the threaded coupling member or nipple 14. Immediately behind the threaded member 14 is a splined collar 18 having a plurality of parallel splines such as spline 20. The extreme end of the cylindrical portion 15 of the nut 13 does not bear against collar 18 since to effect a proper seal, the conical surfaces 17 and the tapered entrance the nut 13 and portion 15 effect a seal and prevent the nut from moving further along the threaded portion of the nipple.

It is to be particularly noted that the retainer sleeve or body 10 includes a bore which is shaped at its cylindrical end 11 with an internal array of parallel splines 21 of reduced diameter, which is adapted to pass into engagement with the external splines 20 of the collar 18. The thickened portion 12 of the retainer sleeve 10 includes a hexagon-configured bore with a plurality of flats, such as flat 19, intending to mate with the flats 16 of the nut 13. The thickened portion of the sleeve represented by numeral 12 is substantially lowered from the external surface of the cylindrical portion 11. The collar portion 11 includes a stepped opening 23 through which the opposite ends of a resilient safety clip 22 resides. One end is a lock catch 24 and bears against a slot 25 communicating with the opening 23. The other end is a holding ear or dog 26 bearing against the end of opening 23 opposite from its communication with slot 25. The collar portion 11 further includes a shoulder or step 27 at the juncture of slot 25 with the opening 23 so that catch 24 may be manually moved in and out of the slot over the step 27 to effect locking or release of the clip 22.

As indicated more clearly in FIG. 2, the cylindrical portion 11 of the retainer includes the array of splines 21 which define the open-ended bore adapted to fit over and conform with the splines 20 of the collar 18. The opposite end of the body or portion 11 includes the portion 12 having a shaped bore coaxially disposed with respect to the open-ended bore and portion 12 is provided with a plurality of flats, such as flat 19, adapted to conform with and mate with the flat 16 on the nut 13.

Referring now in detail to FIG. 3, an actual installation of the inventive retainer sleeve 10 is illustrated in a typical fuel line system. A fuel line 30 is connected to the nipple 14 by means of the nut 13 joining the threaded end of the nipple. It can be seen that as the nut 13 is turned or torqued, the retaining sleeve 10 will turn with the nut as long as the splines are not engaged. When the proper amount of torque has been reached, turning stops and the retaining sleeve 10 is urged towards collar 18 so that the splines 20 and 21 will engage. In the event that alignment cannot be achieved, the ring 10 can be backed-off slightly until the splines can be mated in alignment at which time the ring can now be moved to the left to effect engagement. The facing 33 of the collar 18 will bear against internal shoulders 28 so that the sleeve is seated against the collar. An annular groove 31 is provided behind the facing of collar 18 and the opposing facing of the nut 13. The clip 22 occupies a portion of the annular space up to 348 degrees of engagement. Also, since the hexagon flats 19 of the ring 10 are in alignment or mesh with the flats 16 on the nut 13, the nut 13 cannot rotate since the nut is held in position by the anchored retaining sleeve 10 and locked in place by the clip 22 in the fully expanded position 34.

The lug 26 and catch 24 project through the opening 23. When the ends of the clip 22 are pressed together in the opening, the diameter of the circular clip is reduced. When released, the diameter is increased as the normal bias of the clip expands.

As shown in FIGS. 1 and 6, clip installation catch 24 may occupy slot 25. Lug 26 is then put into position 38. This allows for the clip 22 to be of a larger inner circumference than the flange 35. The very innermost point of lug 26 may then be started into groove 31. The remainder of ring 22 is then fed into the remaining space of groove 31 until it is occupied. When expanded, the catch 24 extends into the slot 25. Lug 26 will occupy position 39. When the clip 22 is compressed, the catch may reside in the opening against the step or shoulder 27 and lug 26 will then occupy notch 38 of opening 23.

When the clip occupies the groove 31, the clip ends are such that the catch 24 is in position on notch 25 and lug 26 bears against the opposite corner 39 of opening 23 respectively. Therefore, a firm connection is made between the splines 20 and the sleeve 11 prevents backing-off of the components by engagement of splines. The clip provides a safety feature preventing back-off since it encircles the collar 18 with the retainer sleeve 10. The clip prevents both axial and radial movement of the connection after the nut and nipple engagement.

The clip diameter is reduced when in the relief groove 32 of sleeve 10 and the diameter is increased when the opposite ends are in the relief groove 34 of sleeve 10.

In actual operation, the sleeve 10 is installed in a conical motion over groove 31. The nut is then inserted into sleeve 10 and rotated to start onto the threaded nipple and turned to maximum torque where rotation is then stopped. The sleeve 10 is rotated so that the splines are mated and engaged respectively between the splines 20 and 21. If misalignment is experienced, the sleeve is backed-off or advanced so that the sleeve is in alignment of the splines of the sleeve and the nipple collar 18. In any event, it is important that the user does not go beyond maximum torque. Always reverse the nut and collar for alignment of the splines. Such reverse movement is very slight since the splines are of small dimension and the space therebetween equally small so as to accommodate alignment with slight movement for backing off the nut and sleeve.

In one method, installation of the spring clip 22 takes place prior to and during partial spline engagement and requires two motions. The first motion is insertion of the midsection segment of the clip into the collar groove 31 followed by a twist or slight rotation of the clip so as to feed the end segments of the clip into the groove. The spring action or bias provides a self-biasing twist which causes the semicircular segment to roll into a secure position of groove 31. However, once the major length of the clip resides within the groove, the opposite ends expand and retain the sleeve or body 10 in position with respect to the collar 18.

Therefore, it can be seen that the safety assembly of the present invention provides for interchangeability with standard couplings such as AN fittings and that the assembly utilizes existing standard hose end or tube end connection to seal by hand by means of a resilient corrosive resistant seal 36 and to lock the external sleeve 10 into place after alignment of the splines and engagement with retention by the clip. When the sleeve 10 is engaged with the splines, the internal clip 22 expands into the lock groove 34. A slight amount of pre-load on the clip and the large surface area of the long radius makes the clip vibration comparable to a snap ring. The clip provides 348° of locking surface.

When the unit is assembled, the fact that the clip 22 is always in the groove 31 and is activated externally either into the locked or unlocked position in an axial motion makes the components remain as a unit. Further, sleeve 10 is of such a length as to encourage the nut 13 to be started straight onto the threaded nipple eliminating the chance of cross threading.

The inventive assembly eliminates contamination at the connection and eliminates hose binding or twisting. To unlock, one finger is employed against catch 24 to retract the clip ends from the outer spline and when this disengagement is achieved, this enables the sleeve to be retracted from spline 20. Offsetting the opposite ends 24 and 26 of the clip 22 when installed in the step or wrap 23 allows the sleeve to be removed when rotating in a conical motion.

Annular groove 31 is provided before spline 20 so as to allow splines 21 to be disengaged from splines 20 and remain as one unit. Once the seal, as shown in FIG. 5 as an example, is attained, collar 10 is able to be pushed into the locking position from any opposing points of collar 10. In order to disengage, the catch or dog must be pushed to the lug and portion 11 pulled back. FIG. 4 shows annular groove 32 at the inner left portion 11 aligning with points 27 and 33 to allow for unrestricted rotation in the unlocked position. FIG. 5 shows an elastomeric seal interposed between the nipple and the nut. The seal in combination with the inventive locking device makes it possible to seal and lock by hand over a wide range of pressures. The seal includes a raised surface of a resilient material to parallel the opposing half of the fluid connection.

FIG. 7 shows that a cover 44 for lock wire hole 23 may be utilized to eliminate foreign particles from lodging between catch 24 and lug 26 in groove 31. The cover or release ring 44 encircles sleeve 10 so as to allow lock ring 22 to be retracted from locking groove 34 at any point around the external surfaces of cover 44. The cover 44 allows a rotational motion by means of point 46 fitting into a mating point 43. Axial movement of sleeve 10 is achieved by a recess 45 in cover 44 that accepts the releasing end of clip 22 and passes over the holding lug 26 with no obstruction. If cover 44 is manufactured in a sheet metal form the ends may overlap so as to act as a vibration dampener over surface 11 to ensure that point 47 shown in FIG. 6 will not crack as it is the weakest part of sleeve 10.

For another method of assembly, FIG. 8 shows ring 22 partially installed while locking at face 48. Sleeve 10 is then positioned over parent body. Bend 49 is started over flange 35 and lowered into groove 31. The remainder of the clip 22 is fed into groove 31 until it reaches lug 26. At that point a small tool of a basic forked tip design is used to hold lug the 26 to decrease the circumference of the clip 22 to the point that the lug 26 is able to be positioned into receiving hole 38. The two components are then pushed together to square up the locking mechanism.

After the unit is assembled, the underside of catch 24 keeps sleeve 10 centered so as to avoid accidental disassembly. A starting ramp 51, shown in FIG. 9, is part of groove 32. When 24 and 26 are pushed together this allows for sleeve 10 to be retracted. Slight retractional movement allows lug 26 to move past point 50 and onto the ramp 51 prior to seating in the groove 32. This enables the sleeve 10 to have a parallel axial movement over the locking mechanism.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A lock assembly for locking a connector body to a sleeve, the lock assembly comprising:

a connector body including a collar, the collar having a plurality of body splines arranged in parallel spaced apart relationship, a circular face at an end thereof, and a lock-ring groove disposed between the body splines and the circular face;

a sleeve defining an open-ended bore for receiving and locking with the connector body, the sleeve having a cylindrical portion, a shaped portion, at least one shoulder projecting inwardly from the sleeve into the open-ended bore, and an opening in the cylindrical portion communicating with the open-ended bore, the cylindrical portion of the sleeve further having a plurality of parallel internal sleeve splines extending into the open-ended bores, with a lock channel being defined between the sleeve splines and the shoulder and an unlock channel formed in the internal sleeve splines;

a resilient expanding lock ring seated in the lock-ring groove for locking the sleeve and connector body together, the lock ring having opposite ends terminating in a release and a catch respectively, said opening including means for reception of said release and catch the lock ring being contractible by operation of the release and catch within the opening means to permit limited axial movement of the sleeve relative to the connector body between a first position wherein the lock ring is located in the lock channel and said lock ring grove with the circular face adjacent the shoulder, and the sleeve splines and body splines mating to prevent rotational and axial movement between the connector body and the sleeve, and a second position wherein the lock ring is located in the unlock channel and said lock ring grove with the sleeve splines and body splines disengaged and rotational movement only between the connector body and the sleeve is permitted.

2. A lock assembly as claimed in claim 1 wherein the unlock channel is located in the sleeve splines at an angle of 90° to the sleeve splines.

3. A lock assembly as claimed in claim 1 wherein the opening means includes notched ends for receiving the release and catch respectively.

4. A lock assembly as claimed in claim 3 wherein the notched ends in the opening means include a first notch position for receiving the release and catch respectively when in the first position and a second notch position for receiving the release and catch respectively when in the second position.

5. A lock assembly as claimed in claim 4 wherein the first and second notch positions in the opening means are shaped to provide a ramp therebetween to permit the release and catch to transition from the second notch position to the first notch position when the sleeve is axially pushed towards the connector body.

6. A lock assembly as claimed in claim 1 wherein the shoulder is located near the transition between the cylindrical portion and the shaped portion of the sleeve.

7. A lock assembly as claimed in claim 6 wherein the shoulder is formed by a step between at least a part of the shaped portion and the cylindrical portion.

8. A lock assembly as claimed in claim 1 wherein the catch is contained in the opening means and extends outside thereof, the release being contained in and extending also from the opening means.

9. A lock assembly as claimed in claim 1 wherein the shaped portion of the sleeve is of hexagonal shape.

10. A lock assembly as claimed in claim 1 further comprising a seal located at a forward end of the collar, the seal being seated in an annular groove in the collar.

11. A locking sleeve assembly for use with a connector body including a collar, the collar having a plurality of body splines arranged in parallel spaced apart relationship, a circular face at an end thereof, and a lock-ring groove disposed between the body splines and the circular face, the locking sleeve assembly comprising:

a cylindrical portion, a shaped portion, an open-ended bore defined by the cylindrical portion and shaped portion for receiving the connector body, at least one shoulder projecting inwardly from the sleeve into the open-ended bore, and an opening in the cylindrical portion communicating with the open-ended bore, the cylindrical portion further having a plurality of parallel internal sleeve splines extending into the open-ended bore with a lock channel being defined between the sleeve splines and the shoulder and an unlock channel being defined in the internal sleeve splines; and a resilient expanding lock-ring seatably insertable in the lock-ring groove for locking the sleeve and connector body together, the lock-ring having opposite ends terminating in a release and a catch respectively, said opening including means for the reception of said release and catch, the lock ring being contractible by operation of the release and catch within the opening means to permit limited relative axial movement of the sleeve and connector body between a first position wherein the lock-ring is in said lock ring grove and is further located in the lock channel with the circular face adjacent the shoulder and the sleeve splines and body splines mating to prevent rotational and axial movement between the connector body and the sleeve, and a second position wherein the lock-ring is in said lock ring grove and is located in the unlock channel so that the sleeve splines and body splines can be disengaged and rotational movement only between the connector body and the sleeve is permitted.

12. A sleeve assembly as claimed in claim 11 wherein the unlock channel is located in the sleeve splines and at an angle substantially square to the sleeve splines.

13. A sleeve assembly as claimed in claim 11 wherein the opening means has notched ends for receiving the release and catch respectively.

14. A sleeve assembly as claimed in claim 13 wherein the notched ends in the opening means include a first notch position for receiving the release and catch respectively when in the first position and a second notch position for receiving the release and catch respectively when in the second position.

15. A sleeve assembly as claimed in claim 14 wherein the first and second notch positions in the opening means are shaped to provide a ramp therebetween to permit the release and catch to transition from the second notch position to the first notch position when the sleeve is axially pushed towards the connector body.

16. A sleeve assembly as claimed in claim 11 wherein the shoulder is located near the transition between the cylindrical portion and the shaped portion of the sleeve.

17. A sleeve assembly as claimed in claim 11 wherein the shoulder is formed by a step between at least a part of the shaped portion and the cylindrical portion.

18. A sleeve assembly as claimed in claim 11 wherein the catch is contained in the opening means and extends outside thereof, the release being contained in and extending also from the opening means.

19. A sleeve assembly as claimed in claim 11 wherein the shaped portion of the sleeve is of hexagonal shape.

* * * * *